(12) United States Patent
Zamir

(10) Patent No.: US 11,904,516 B2
(45) Date of Patent: Feb. 20, 2024

(54) SYSTEM AND METHODS FOR AN INJECTION MOLDING MACHINE OPERABLE WITH AN ADDITIVE FEEDER SYSTEM

(71) Applicant: Ofri Zamir, Hogla (IL)

(72) Inventor: Ofri Zamir, Hogla (IL)

( * ) Notice: Subject to any disclaimer, the term of this patent is extended or adjusted under 35 U.S.C. 154(b) by 784 days.

(21) Appl. No.: 16/088,144

(22) PCT Filed: Mar. 6, 2017

(86) PCT No.: PCT/IB2017/051289
§ 371 (c)(1),
(2) Date: Sep. 25, 2018

(87) PCT Pub. No.: WO2017/168271
PCT Pub. Date: Oct. 5, 2017

(65) Prior Publication Data
US 2020/0398467 A1    Dec. 24, 2020

Related U.S. Application Data

(60) Provisional application No. 62/313,751, filed on Mar. 27, 2016.

(51) Int. Cl.
*B29C 45/18* (2006.01)
*B29C 45/17* (2006.01)
(Continued)

(52) U.S. Cl.
CPC ...... *B29C 45/1808* (2013.01); *B29C 45/1774* (2013.01); *B29C 45/1816* (2013.01);
(Continued)

(58) Field of Classification Search
CPC ................. B29C 45/1808; B29C 45/1816
See application file for complete search history.

(56) References Cited

U.S. PATENT DOCUMENTS 3,530,754 A * 9/1970 Gabor ................ B29C 48/29
83/354
3,564,650 A   2/1971 Irving
(Continued)

FOREIGN PATENT DOCUMENTS

DE       10223374 B4    12/2003
EP       2406056 A1     1/2012
(Continued)

OTHER PUBLICATIONS

Mark S. Nixon & Alberto S. Aguado; Feature Extraction & Image Process for Computer Vision (Third edition) 2012 Chapter 13—Appendix 4 (Year: 2012).*

(Continued)

*Primary Examiner* — Jacob T Minskey
*Assistant Examiner* — Wayne K. Swier
(74) *Attorney, Agent, or Firm* — AlphaPatent Associates Ltd.; Daniel J. Swirsky

(57) ABSTRACT

An additive feeder system is presented which is operable for use in a plastic injection molding machine including an injection component and a clamping component. The additive feeder system includes a feeder control unit, a feeder supply mechanism and feeder dosage control mechanism. The additive feeder system is operable to provide a specific dosage of the additive materiel in real-time for mixing with the raw material to achieve desired product characteristics. The additive feeder system may be applied to injection molding and extrusion, such as molding processes, plastic molding processes, blow molding, compression molding, extrusion molding, injection molding and laminating, and comprising additive feeders, for example for color mixing and nutrient supplements.

13 Claims, 5 Drawing Sheets

(51) Int. Cl.
*B29C 45/76* (2006.01)
*B29C 45/00* (2006.01)

(52) U.S. Cl.
CPC .. *B29C 45/7686* (2013.01); *B29C 2045/0091* (2013.01); *B29C 2045/1792* (2013.01); *B29C 2045/185* (2013.01)

(56) References Cited

U.S. PATENT DOCUMENTS

| | | | |
|---|---|---|---|
| 3,892,390 A * | 7/1975 | Eauclaire | B29C 48/29 366/156.1 |
| 4,179,041 A * | 12/1979 | Chambon | B29C 48/286 222/145.6 |
| 4,443,109 A * | 4/1984 | Watts | B01F 33/80514 366/186 |
| 4,848,915 A | 7/1989 | Fintel | |
| 4,919,872 A * | 4/1990 | Fintel | B29C 48/05 264/211.14 |
| 5,116,547 A * | 5/1992 | Tsukahara | B29C 45/0013 264/211 |
| 5,358,680 A * | 10/1994 | Boissonnat | B29B 7/60 264/211 |
| 5,439,623 A | 8/1995 | Fintel | |
| 6,007,236 A | 12/1999 | Maguire | |
| 6,772,151 B1 | 8/2004 | Johnston et al. | |
| 7,897,093 B2 * | 3/2011 | Jones | B29B 7/885 264/328.8 |
| 8,444,923 B2 | 5/2013 | Persinger et al. | |
| 2003/0168758 A1 | 9/2003 | Bickel | |
| 2004/0197435 A1 | 10/2004 | Shepherd et al. | |
| 2008/0063869 A1 | 3/2008 | Mortazavi | |
| 2010/0103763 A1 * | 4/2010 | Ponzielli | B29B 7/482 366/76.6 |
| 2012/0199998 A1 * | 8/2012 | Bledzki | B29C 48/2886 264/165 |
| 2015/0165662 A1 | 6/2015 | Maguire | |

FOREIGN PATENT DOCUMENTS

| | | | | |
|---|---|---|---|---|
| JP | 854149763 A | | 11/1979 | |
| JP | 8609948 U | | 1/1985 | |
| JP | H0214259 A | | 1/1990 | |
| JP | H03062828 A | | 3/1991 | |
| JP | H05138651 A | | 6/1993 | |
| JP | H06119833 A | | 4/1994 | |
| KR | 20110059097 A | * | 6/2011 | ............. B29C 31/06 |
| KR | 101347255 B1 | * | 1/2014 | ............. B29B 11/00 |

OTHER PUBLICATIONS

Machine translation JPH0362828A from IDS Mar. 31, 2021 (Year: 1991).*
Machine translation KR20110059097A (Year: 2011).*
Machine translation KR101347255B1 (Year: 2014).*

* cited by examiner

SYSTEM AND METHODS FOR AN INJECTION MOLDING MACHINE OPERABLE WITH AN ADDITIVE FEEDER SYSTEM

CROSS-REFERENCE TO RELATED APPLICATIONS

This application is a U.S. National Phase Application under 35 U.S.C. 371 of International Application No. PCT/IB2017/051289, which has an international filing date of Mar. 6, 2017, and which claims priority and benefit from U.S. Patent Application No. 62/313,751, filed Mar. 27, 2016, the contents and disclosure of which are incorporated herein by reference in their entirety.

FIELD OF THE INVENTION

The disclosed subject matter herein relates to the product manufacturing industry. In particular, the disclosure relates to usage of additive feeder systems associated with manufacturing forming machines, including, but not limited to, injection molding machines, extrusion molding machines, extruder units, blow molding machines, compression molding machines, adhesive coating machine and the like. The additive feeder may be used with processes associated with molding/plastic molding processes, blow molding, compression molding, extrusion molding, injection molding, laminating, and additive feeders, for example color mixing and nutrient supplements.

BACKGROUND OF THE INVENTION

Injection molding is a manufacturing forming process for producing parts by injecting material into a mold. Injection molded plastics may be used to create many components and products for various industries such as automotive, packaging, electronics & consumer goods, building & construction, healthcare, medical disposal, and technological advancements such as computer aided engineering, automation and the like, is boosting the growth of the market.

The increasing demand of injection molded plastics is clearly indicated globally, mainly in North America and Europe as well as pacific Asia. According to a recent business report published by Allied Market Research (AMR) "World Injection Molded Plastic Market—Opportunities and Forecasts, 2014-2020", the world market for injection molded plastics would be worth $162 billion by 2020, registering a CAGR of 4.9% from 2015 to 2020. Polypropylene injection molded plastics would continue to dominate the market through 2020.

The main raw material used to manufacture a product using a plastic injection molding and extrusion machines, typically comes in granular forms, and may include various additives such as dyes, UV, etc. Many of the additives, especially dyes, are provided in granulated form (i.e., granular material).

Supplements are typically provided via volumetric feeders or weighing feeders, which are not accurate, and which do not allow replacement of dyes or additives easily.

Some solutions to the above have been proposed, for example as described in patent publications US 2009/0115087, and WO 2012/016715, which describe high-pressure injection system, without technological Piezoelectric, and patent publications US 2002/0167103, which describe high-pressure injection system, with technological Piezoelectric.

The systems described in the prior art all place the injection head deep in the extruder in the hot area (molten material area). One advantage of placement in this location is that only the material at the hot area before injection goes through the extruder. Therefore dye replacement and/or extension may be performed at the end of the process without using too much raw material. This may reduce the amount of material waste. Another advantage is that the extruder cleans itself in the hot area, injecting the raw material until the new material arrives.

Nevertheless, one disadvantage of the solutions described in the prior art is the difficulty in achieving a high-precision dose using a syringe at high pressures.

Another drawback is that they require high pressure systems for injection of substances, which are more expensive systems.

Furthermore, there is an inherent disadvantage to late injection mixing in the extruder because the injection may be incomplete and distribution of materials may not be uniform. Additionally, low labor cost, minimum waste production, faster production, and ability to process multiple raw materials simultaneously are essential for boosting the market growth.

The need remains therefore for producing an efficient and automated additive feeder material mechanism for molding and extrusion systems.

The invention described herein addresses the above-described needs.

SUMMARY OF THE INVENTION

According to one aspect of the presently disclosed subject matter, there is provided an additive feeder system for use in a manufacturing forming machine, the manufacturing forming machine comprising: at least one melting mechanism operable to convert a raw material into a melted material, the melting mechanism comprising at least one hopper operable to receive said raw material, a motor driven extrusion unit and at least one heater operable to melt said raw material; the additive feeder system operable to generate an additive material to provide a desired product characteristics, the additive feeder system comprising: a feeder control unit operable to control the additive feeder system; a feeder supply mechanism operable to provide one or more feed-lines from at least one supply unit; a feeder dosage control mechanism operable to administer the additive material at a desired dosage; and wherein the additive feeder system is operable to provide a specific dosage of the additive material in real-time for mixing with the raw material to achieve the desired product characteristics; and wherein the additive material is generated of one or more feed-lines fed by the feeder supply mechanism into the feeder dosage control mechanism.

Variously, the manufacturing forming machine may be one of: an injection molding machine, an extrusion molding machine, an extruder units, a blow molding machine, a compression molding machine and an adhesive coating machine or combinations thereof. Accordingly, the additive feeder may be connected between the hopper and the motor driven extrusion unit of the manufacturing forming machine. As appropriate, the raw material is a combination of material types selected from: plastic granules, plastic pellets, plastic flakes, plastic powder, liquid additive and combinations thereof.

As appropriate, the feeder supply mechanism is operable to feed the feed-lines from one or more feed-sets, each of the feed-set is configured to provide one or more feed-lines.

Accordingly, the supply unit of the feed-lines comprises a feeder selected from a group consisting of: a drum unit, a roller unit, a pulley, a reel, a dye injection head and a storage container unit.

As appropriate, the feeder dosage control mechanism comprises an electric system operable to drive said feeder dosage control mechanism. Additionally or alternatively, the feeder dosage control mechanism may include a pneumatic system or a hydraulic system.

As appropriate, the feeder dosage control mechanism comprises a cutter unit operable to cut said one or more feed-lines in a desired length. The cutter unit is operable to cut the feed-lines into a throat attached to the motor driven extrusion unit at a rate controllable by the control unit. The additive material may be cut by the cutter unit at a size such that it may not fall within the raw material granules. Additionally, the additive material may be cut by the cutter unit at a weight of about one 0.005 grams to 0.01 grams.

Variously, the cutting mechanism may be selected from: a single bladed cutter, a multi-bladed cutter, a rotatable disk cutter, a guillotined scissor, a laser mechanism and a thermal cutter.

Optionally, the control unit further comprising a controller operable to communicate commands comprising as at least one control signal and may also include a processing unit operable to execute a software application, comprising a computerized user interface operable to receive and send control commands. As appropriate, the computerized user interface further comprises a touch screen, and the control unit may further include a wireless communication layer or a wired communication layer.

As appropriate, the controller is operable to control operation of the feeder dosage control mechanism and further may be operable to control operation the feeder supply mechanism. Optionally, the processing unit may interface with a mobile device via the user interface layer. Furthermore, the processing unit may be operable to interface with a remote server machine via the computerized user interface. Additionally, the control unit may further include a display module operable to display data pertaining to the additive feeder system. Where appropriate, the display module may be operable to display data pertaining to the manufacturing forming machine.

As appropriate, the feed-lines may include flexible characteristics such that the feed-lines may be capable of being wound in a pre-configured dimension and to avoid breaking material.

Variously, the control unit is configured to receive one or more of the following input parameters: a product designed weight parameter, a raw material gray level parameter, a final product color parameter, a weight of the additive material (meter/gram) parameter, a specific weight parameter, an additive feed-line diameter parameter, a UV parameter. Accordingly, the control unit may be operable to receive a colored image representing the raw material color parameter or the final product color parameter.

As appropriate, the additive feeder system may further include a data collector module operable collect operational data and enable learning and further fine tune the input parameters.

Optionally, the control unit may include a memory unit and storage unit, and may further be configured to alert when said supply unit needs a replacement.

According to another aspect of the presently disclosed subject matter, there is provided an additive feeder system for use with a batch-blender machine, the batch-blender machine comprising at least one hopper operable to receive a raw material, a weighing container, a motor driven mixing unit operable to mix the raw material homogenously and a discharge unit operable to discharge the mixed material; the additive feeder system is operable to generate an additive material to provide a desired product characteristics, the additive feeder system comprising: a feeder control unit operable to control the additive feeder system; a feeder supply mechanism operable to provide one or more feed-lines from at least one supply unit; a feeder dosage control mechanism operable to administer the additive material at a desired dosage; and wherein the additive feeder system is operable to provide a specific dosage of the additive material in real-time for mixing with the raw material to achieve the desired product characteristics; and wherein the additive material is generated of one or more feed-lines fed by the feeder supply mechanism into the feeder dosage control mechanism.

As appropriate, with the batch-blender machine, the blender may weigh a certain amount of the raw material and then adding the additive material accordingly related to the weight of the raw material. For example, say weighing container includes 1 (one) kg of raw material, and the feeder provides 2%, meaning extra 20 grams of additive material and moved onto a mixing container and further into a storage container, for future use.

According to yet another aspect of the presently disclosed subject matter, the additive system teaches a method for use in an additive feeder system providing automatically an additive material to a manufacturing forming machine, in an improved manner, the additive feeder system comprising: a feeder control unit comprising a setup configuration characterized by at least one parameter; a feeder supply mechanism comprising one or more feed-line sets operable to provide one or more feed-lines; and a feeder dosage control mechanism comprising one or more cutter motors and operable to administer the additive material at a desired dosage, the additive feeder system operable to execute a software application, the method comprising: obtaining said setup configuration of the feeder control unit; receiving monitored data from the manufacturing forming machine; determining the feeder supply mechanism control parameters; determining the feeder dosage control mechanism parameters for each of the cutter motors; and transmitting at least one control signal to the control unit configured to drive the feeder supply mechanism and the feeder dosage control mechanism according the configuration setup to generate the additive material such that a final product characteristics are achieved.

Variously, the setup configuration may include one or more of: a raw material gray level parameter, a product designed weight parameter, a final product color parameter, a weight of the additive material (meter/gram) parameter, a specific weight parameter, an additive line feed diameter parameter, a color standard. Further, the step of determining the feeder supply mechanism control parameters may include: assigning each feed-line of the feed-line sets an input pulling speed value. Similarly, the step of determining the feeder dosage control mechanism control parameters may include: assigning each cutter motor a rotating speed value.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DETAILED DESCRIPTION

Figure 1:
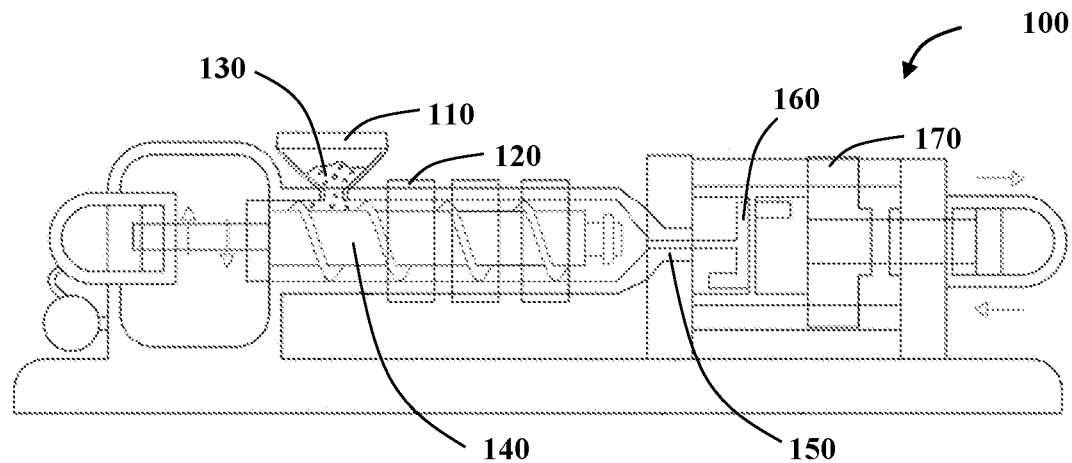
FIG. 1 is a schematic diagram representing an example of a conventional PRIOR ART injection molding machine.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects of the present disclosure relate to the plastic industry, more specifically, to plastic molding systems. In particular, the current disclosure provides an automatic additive feeder used to accurately supplement the granular plastics of the hopper with dye additives and color mixing to injection molding and extrusion machines.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

As used herein, the term "extrusion" refers to a high-volume manufacturing process in which raw material (plastic, for example) is melted and formed into a continuous profile.

As used herein, the term "mold" refers to a hollowed-out block that is filled with a liquid or pliable material such as plastic, glass, metal and the like. The liquid hardens or sets inside the mold, adopting its shape.

As used herein, the term "injection molding" refers to a manufacturing process for producing parts by injecting raw material into a mold or a matrix.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

It is noted that various examples of such are described in the applicants' submitted applications, U.S. application No. 62/313,751 on 27 Mar. 2016 which is incorporated herein by reference.

The plastic molding industry uses fairly homogeneous technology, with limited variations. Yet, accuracy is vital to ensure optimization and control of cost and quality of the production process, creating the need for developing an efficient additive feeder. Accordingly, the disclosed subject matter offers accurate dosage solution provided in real-time and is further configured to integrate with existing market systems, in an improved manner, as part of the molding injection process.

The plastic industry technology mainly employs supplements and additives which are typically provided via volumetric feeders or weighing feeders. These feeders operate at low accuracy and do not allow replacement of dyes or additives easily.

The additive feeder system or color mixing system products may be the base for selling dyes and additive materials. Currently, the dominant granular plastic feeder on the market is the volumetric feeder. Yet this feeder is exposed to numerous disadvantages such as long calibration time required to adjust the additive quantity to a machine cycle; low prediction as to quantity of additive material; and low reliability, unstable and sensitive weighing system.

The currently presented disclosure offers various advantages over the Weighing Feeders such as: new technology, real-time, mechanical edge cutting mechanism; high reliability, no weighing elements, vacuum associated components and not sensitive temperature and vibrations; no/minimal possibility of material exchange due to long setups and calibration requirements; simplified method of operation, colored digital touch screen, software application configured to execute on a mobile device and PC/Laptop and a wide range of operations—the disclosed feeder may be configured, via the display touch screen, to work with three types of machines such as: injection molding machines, blow extrusion machines and extrusion machines; and save shelves space, less additive storage required/competitive pricing associated with short market runs, quick dye changes and short setup cycles.

It is noted that the additives of the current disclosure may also be associated with Master-batch and Compounding.

As appropriate, Mater-batch refers to solid or liquid additives used for coloring a plastic product. Master-batch may also be used for enhancing additives with specific properties such as anti-static, UV stabilizer, metal deactivator and the like, added to a base polymer.

As appropriate, Compounding are ready-made blends of raw material which may be automatically dosed with fixed set-points usually through feeders/hoppers. Compounding is further associated with preparing plastic formulations by mixing or/and blending polymers and additives in a molten state.

DESCRIPTION OF THE EMBODIMENTS

Reference is now made to FIG. 1, there is provided a conventional, PRIOR ART plastic injection molding machine, schematically representing a possible structure with an injection component and a clamping component, which is generally indicated at 100, for converting a raw material into a melted material, as shown in various prior art publications such as U.S. Pat. No. 8,622,726 to Fitzpatrick. The injection component includes a hopper 110 operable to receive raw material 130, a motor driven extrusion unit 140, a heater 120 operable to melt the raw material and a nozzle 150. The clamping component includes a mold cavity 160 and a mold 170, whereas the nozzle 150 is operable to inject the melted material into the mold 170. It is noted that the motor driven extrusion unit 140 may include a rotating screw or a piston operated with an associated cylinder or a barrel.

It is noted that the above injection molding machine is shown by way of an example to a family of manufacturing forming machine, associated with the current disclosure.
System Layout:

It is noted that the additive material system, as described hereinafter, may provide various technological implementations configured to serve different needs and different injection/extrusion setups. The additive system may include software and hardware components interfaced and controlled digitally, and may be configured to produce real-time additive material, inject premixed dyes and/or materials comprising various characteristics. For example, the additive system may be operable as a standalone unit, as a final material additive unit, as a batch-blender additive unit or may be integrated into an existing molding/extrusion system configuration. Accordingly, the additive system may be controlled via the stand-point of the machine or by a dedicated control unit. As appropriate, the control unit may include a processor operable to execute a software application controllable by a touch screen, a mobile device or receive command instructions from a remote console. Furthermore, the additive system may include a controller, a display module and the like, as described hereinafter.

Figure 2:
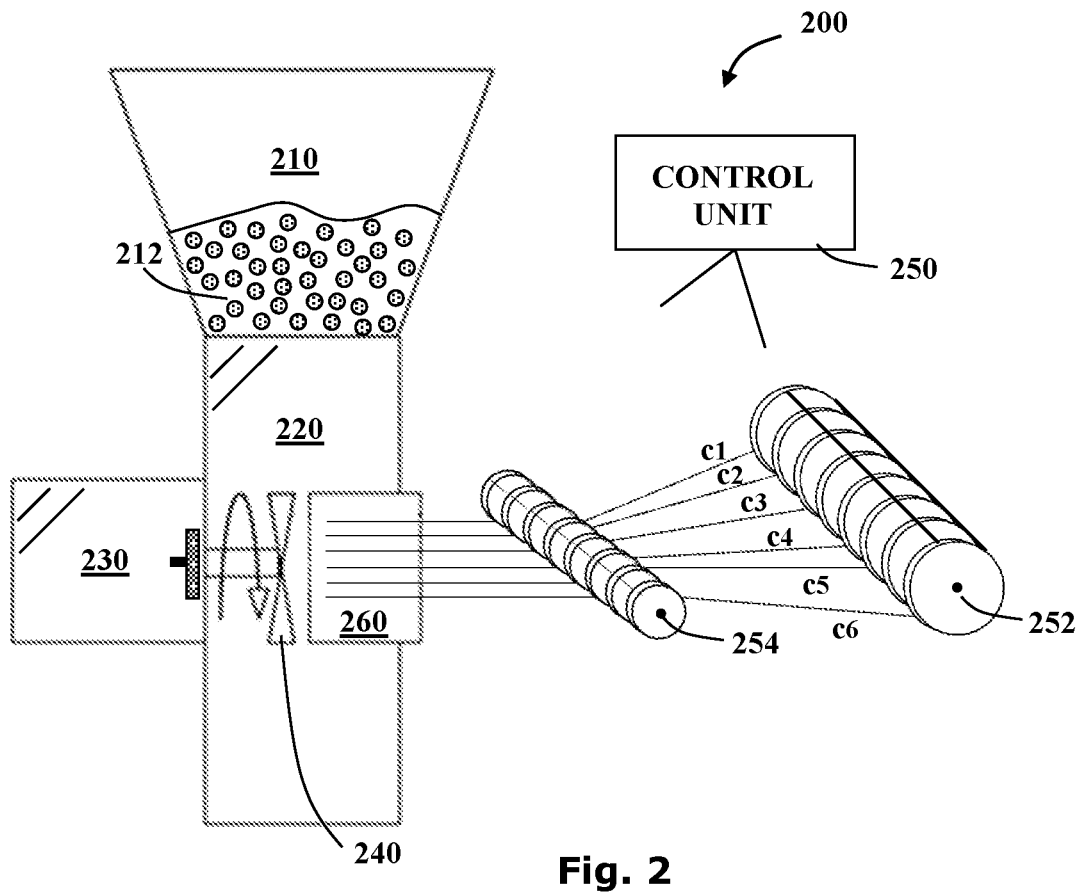
FIG. 2 is a schematic block diagram of a possible additive feeder system for generating an additive material for use in the system of FIG. 1.

Reference is now made to FIG. 2, there is provided a schematic additive feeder system, which is generally indicated at 200, for generating an additive material (color, UV, heat resistant additives, flame reducers and the like) to provide a desired product characteristics, manufactured in a plastic injection molding machine, as shown in FIG. 1. The additive feeder system 200 comprising: a feeder control unit 250 operable to control the additive feeder system 200; a feeder supply mechanism 252 operable to provide one or more feed-lines from at least one supply unit 254; a feeder dosage control mechanism 260 designed to introduce minor additive ingredients at the flow of the main material and operable to administer the additive material at a desired dosage.

It is noted that the reference to an injection molding machine is illustrated by way of an example to a family of manufacturing forming machine, associated with the current disclosure. The manufacturing forming machine may be selected from a family of machines such as injection molding machines, extrusion molding machines, extruder units, blow molding machines, compression molding machines, adhesive coating machines and the like.

It is further noted that the additive feeder system 200 may be connected between the hopper 210 and the motor driven extrusion unit (item 140, FIG. 1) of the plastic injection molding machine (FIG. 1). The hopper 210 of the molding/extrusion system, as a storage container, may collect the raw material (unmolded plastic material) 212 for mixing with a specific dosage of the additive material, in real-time, to achieve the desired product characteristics associated with color, UV, heat resistant additives, flame reducers and the like. Additionally, the raw material may be a combination of various material types such as granules, pellets, flakes, material powder and combinations thereof.

The feeder control unit 250 further comprising a processing unit, a controller, a user interface and, optionally a display module as described hereinafter, in FIG. 3A-B.

The feeder supply mechanism 252 is operable to feed the feed-lines from one or more feed-sets of the supply unit 254, each of the feed-set may be configured to provide at least one feed-line. Accordingly, the supply unit 254 of the feed-lines may be wound and provided in a form such as a drum unit, a roller unit, a pulley, a spool, a reel or a storage container unit.

The feeder dosage control mechanism 260 may be driven by a motor 230, wherein the motor 230 and the associated driving system may be an electric system, a pneumatic system or a hydraulic system. Furthermore, the feeder dosage control mechanism 260 may comprise a cutter unit 240, as detailed in FIGS. 6A-D, operable to cut one or more feed-lines in a desired length, and accordingly at a desired weight. Additionally, the cutter unit 240 may be operable to cut the feed-lines into a throat attached to the motor driven extrusion unit (item 140, FIG. 1), at a rate controllable by the control unit 250. As appropriate, the additive may be thoroughly mixed within the throat to ensure the mixing of the additive and the raw material.

It is noted that the dosing is triggered or speed-governed by the control unit. Additionally, the high accuracy of the dye supplement reduces significantly production cost, as the supplement/additive cost is 4-10 times of the plastic granules. Furthermore, according to the presently disclosed subject matter, the system may be connected between the hopper and the extruder of an injection molding/extrusion setup, where an additive feeder is typically located, where the suggested technological solution caters for producing the dye additive accurately and in real-time, and further allow change of additives without the need to stop the molding machine.

The currently disclosed additive feeder is operable at high accuracy and is configured at a resolution of 0.005 grams to 0.01 grams compared to the market known weighing feeders that operate at accuracy of 0.5 gram, providing accuracy of 30 times better than market devices. Additionally, the disclosed additive feeder provides a short setup time, in which the operator needs to determine the desired weight, desired color and specific weight for each color, enables automatic system control. The existing weighing feeders require lengthy learning time, dye portion weight setup time is long with no ability to change color. Furthermore, the feeder includes a remote control system, computerized software applications and is configured to provide up-to-date digital technology. Thus, in all molding aspects, requires a mechanism to provide accurate dosage, in a rapid and reliable manner in order to maintain required level of product quality.

It is noted that the feed-lines be at least in part flexible such that the feed-lines are capable of being wound onto the supply unit 254. Thus, the feed-lines may be wound onto a drum, a reel, a storage unit and the like, in pre-configured dimensions without breaking.

The system may create a high-precision color at precise doses, and may further allow small amounts to be used. The system may be used in all areas for mixing and creating color, and producing any color. As appropriate, the current disclosure may provide various additional functional alternatives such as using the additive feeder system with a ready-made additive material. Additionally or alternatively, the system may be used with additive dye material injected into the raw material at a quantity or may further be used as an additional component to a batch-blender to generate the final blended material. Furthermore, the additive feeder system may be operable as the main feeder of granules to the molding machine, in cases where the molding machine are small in size, thus the final material may be cut directly into the extruder unit (as may be applicable to piston operated injection molding machines, without a rotating screw).

It is noted that the additive material may be composed of an additive such as the desired color and various polymer types such as PVC, ABS, PPP and the like. The polymer quantity may need to be minimal to allow elasticity of the additive material such that the material may be wound onto a supply unit without breaking.

It is particularly noted that real-time colorants may be created by mixing color additives in real-time by cutting the granular additive direct into the molding or extrusion machine. Thus, rather than an additive manufacturer cutting additives in a plane by plane injection, additive cords may be rolled onto drums or pulleys. The manufacturer may therefore supply additives by providing drums of rolled additive cords to a customer.

Drums of additive cords in various colors and materials may be supplied as required. Where appropriate, multiple cords may be fed directly into the molding machine allowing combinations of colors in real time. It will be appreciated that any color may be produced by combining at least three cords of different colors. So, for example, cyan, magenta, yellow and black may be used in a CMYK color model, similarly red, green and blue may be combined with both white and black in an RGB model (using Hex Color Code) or blue, red, yellow and black for BRYK model. Other alternatives may use base colors of red, blue and yellow. Where required, additive cords may be supplied having special colors such as gold, silver or other metallic colors, or having fluorescent properties or the like.

Figure 3A:
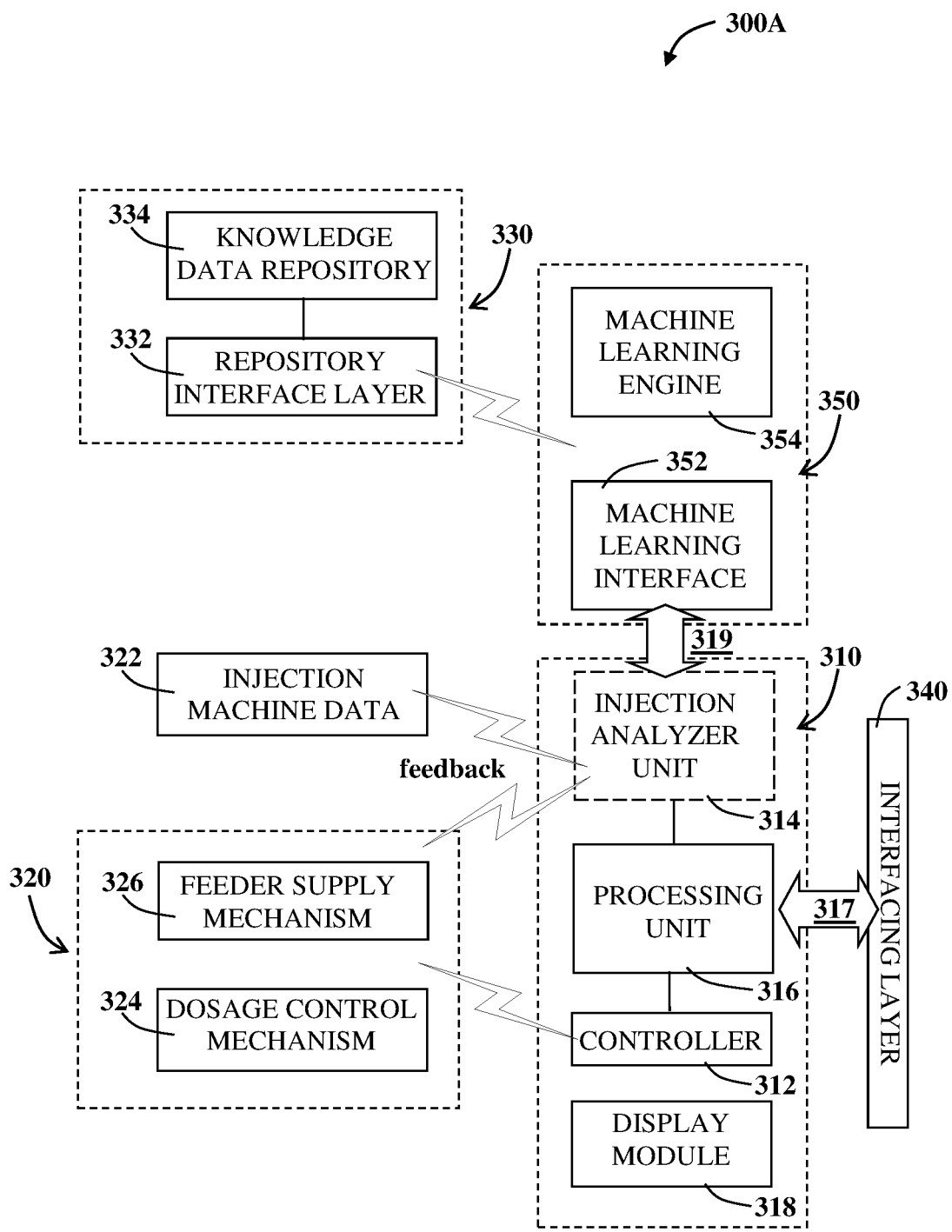
FIG. 3A is a schematic block diagram of block diagram of an additive feeder system representing one possible system layout including control unit components and associated learning mechanism.

Reference is now made to FIG. 3A, there is provided a schematic block diagram of an additive feeder system, which is generally indicated at 300A, representing one possible system layout, including detailed control unit components and associated learning mechanism. It is stressed that the particulars of the presented layout is shown by way of example and for purposes of illustrative discussion only. Other alternatives may be applicable to serve the needs of the current disclosure.

The additive feeder system layout 300A may include a control unit 310 operable to control the additive feeder system hardware components and an additive hardware unit 320 controllable by the control unit 310. Optionally, the system layout 300A may include a data repository module 330 comprising a knowledge data repository 334 (may be used as color information data repository) and a machine learning module 350.

The additive hardware unit 320 may include a dosage control mechanism 324 operable to administer the additive material at a desired dosage and a feeder supply mechanism 326 operable to provide one or more feed-lines wound over at least one supply unit such as a drum, a pulley and the like.

The control unit 310 may include a processing unit 316 operable to execute a software application for controlling the additive feeder system and further comprising a computerized interfacing layer 340 to allow for external communication via a mobile device, a remote server and the like. The control unit 310 may also include a controller 312 operable to communicate commands, comprising at least one control signal, to the additive hardware unit 320 and a display module 318 operable to display data pertaining to the additive feeder system. Optionally, the control unit 310 may include an injection analyzer unit operable to receive injection/extrusion data (such as molding/extrusion operational parameters, temperature, humidity parameters and the like) via an associated injection machine data module 322 and further monitor the additive system hardware components.

As appropriate, the molding/extrusion operational parameters may refer to machine operational indicator/states such as "filling", "injection", "encoding", "change rate", "material pulling pace" (applicable mainly for manufacturing yarns and pipes) and the like. It is noted that the additive feeder mechanism needs to be continuously operational and provide the additive feed-lines at the right pace according to machine configuration.

It is noted that the control unit 310 is operable to control the operation of and the dosage control mechanism 324 and the feeder supply mechanism 326, optionally via the controller 312. Optionally, the computerized interfacing layer may further include a touch screen or may be configured to connect with a mobile device such as a smartphone, a tablet, a laptop and the like. Optionally, the control unit may further include a wireless communication layer or a wired communication layer. Optionally, the display module 318 is further operable to display data pertaining to the injection molding/extrusion machine (item 100, FIG. 1). Those skilled in the art to which this invention pertains will readily appreciate that numerous changes, variations and modifications can be made without departing from the scope of the invention mutatis mutandis.

It is noted that the additive feeder system is operable to provide the necessary product characteristics according to the configuration setup parameters. Regarding the shade of color, optionally, a spectrum analyzer or prototyping may help to reach the desired shade of color of the raw material and of the final product. It may be possible to use input of a captured colored image by a camera or a scanner. Further, the software application is operable to generate the additive material according the input fed into the additive feeder system 300A and according to the various color standards such as RAL, PANTONE and more, reading the color value in Hex values. Accordingly the control unit 310 controls the supply mechanism 326 and the cutting by the dosage control mechanism 324.

Figure 3B:
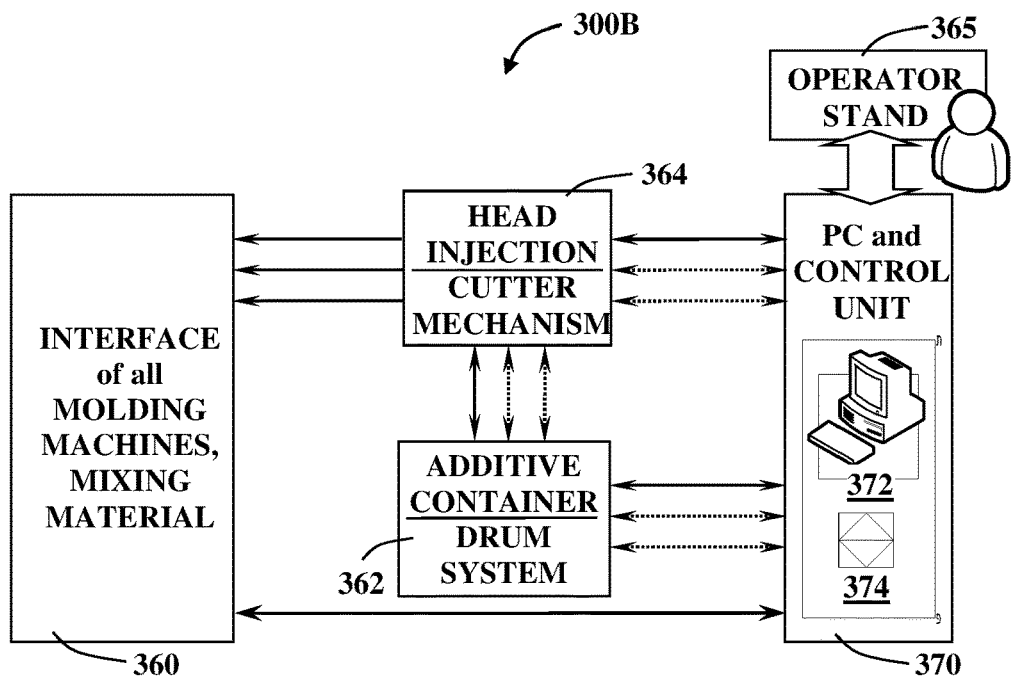
FIG. 3B is another schematic block diagram of block diagram of an additive feeder system representing one possible system layout.

Reference is now made to FIG. 3B, there is provided another possible schematic block diagram of an additive feeder system, which is generally indicated at 300B. The block diagram of the feeder system 300B includes a control unit 370 operable to communicate remotely or by a user at an operator stand 365, a head injection/cutter mechanism 364, an additive container/a drum system 362 and an interface 360 to all molding machines and the raw material. The control unit 370 may further include a processing unit (or a PC) 372 interacting with a controller 374.

Figure 4:
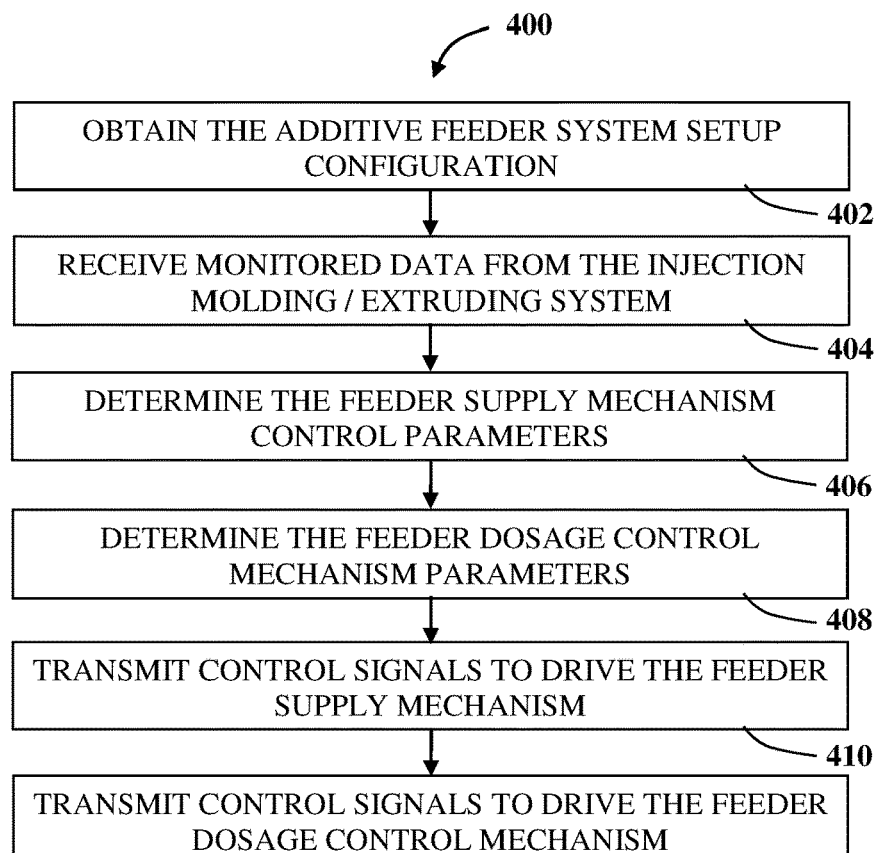
FIG. 4 is a flowchart representing selected actions illustrating a possible method for use in an additive feeder system providing automatically an additive material to an injection molding system.

Processing Logic:

Reference is now made to FIG. 4, there is provided a flowchart representing selected actions illustrating a possible method configured for controlling an additive feed system, which is generally indicated at 400, for providing additive granules or liquid for a molding injection machine. The method 400 includes the following steps: In step 402—the system obtains the additive feeder system setup configuration, where the configurations characterized by at least one parameter such as: a raw material gray level parameter, a product designed weight parameter, a final product color parameter, a weight of the additive material (meter/gram) parameter, a specific weight parameter, an additive line feed diameter parameter, a color standard (PANTONE, RAL or others). In step 404—the system receives monitored data from the plastic injection molding system. In step 406—the system determines the feeder supply mechanism control parameters, which is particularly applicable where the feeder supply mechanism includes one or more feed-line sets. This step may include assigning each feed-line of the feed-line sets an input pulling speed value. In step 408—the system determines the feeder dosage control mechanism parameters, where the feeder dosage control mechanism comprises one or more cutter motors, and further assigns each cutter motor a rotating speed value. In step 410—the system transmits at least one control signal to the control unit configured to drive the feeder supply mechanism. In step 412—the system transmits at least one control signal to the control unit configured to drive the feeder dosage control mechanism.

It should be appreciated, by way of illustrative example, that for a single processing, the operator may select the raw material, RAL standard color shade according to customer request and further input the final product weight parameter. The system may use these parameters to calculate the additive percentage, giving the additive weight required to obtain the desired characteristics. Thus, the system may extract from the additive percentage to color quantities according to the set of possible color inputs. For example, red—60%, yellow—25%, blue—10% and black—5% (or weight per color). Once the desired set of colors is determined, the additive feed system is operable to cut each feed-line color in the desired quantity (length/weight), pushing it into the motor driven extruding unit. Thus, for example, changing the shade into a darker color may involve adding black additive material, and for a lighter color, the amount of dark may be reduced. Accordingly, for stronger color of a shade, more color may be added, apart from black.

Illustrative Prototype Embodiment:

As illustrated, FIGS. 5A-B and FIGS. 6A-C present various views of one possible embodiment of an additive feeder system.

Figure 5A:
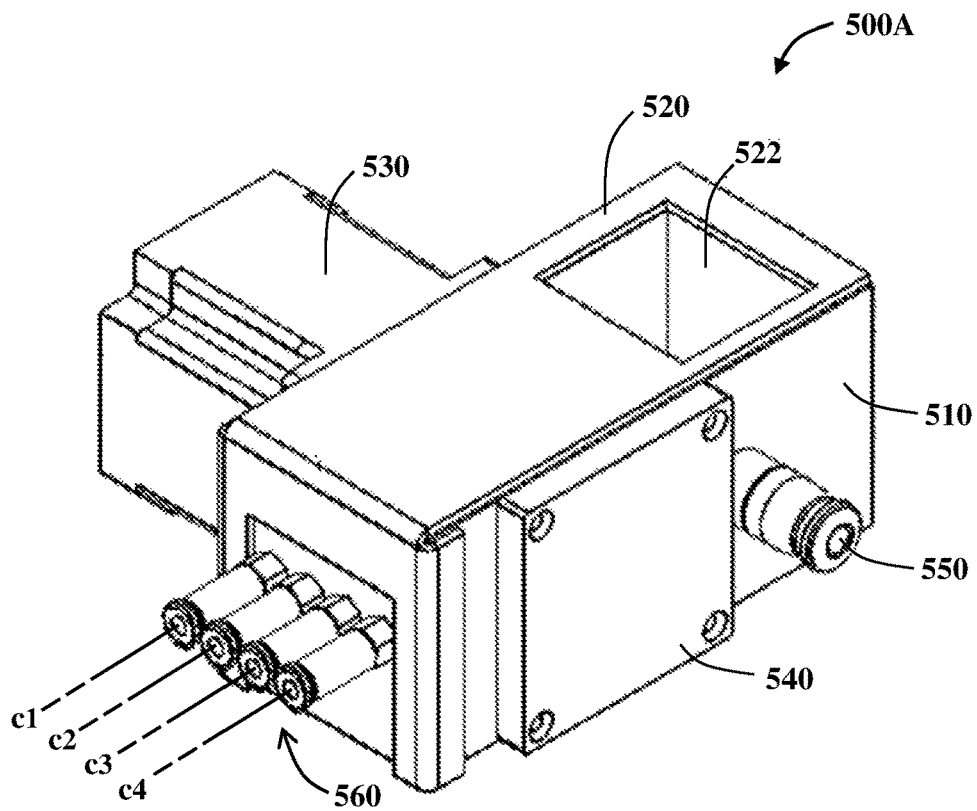
FIG. 5A is an isometric view of an additive feeder system showing a possible prototype assembly.
Figure 5B:
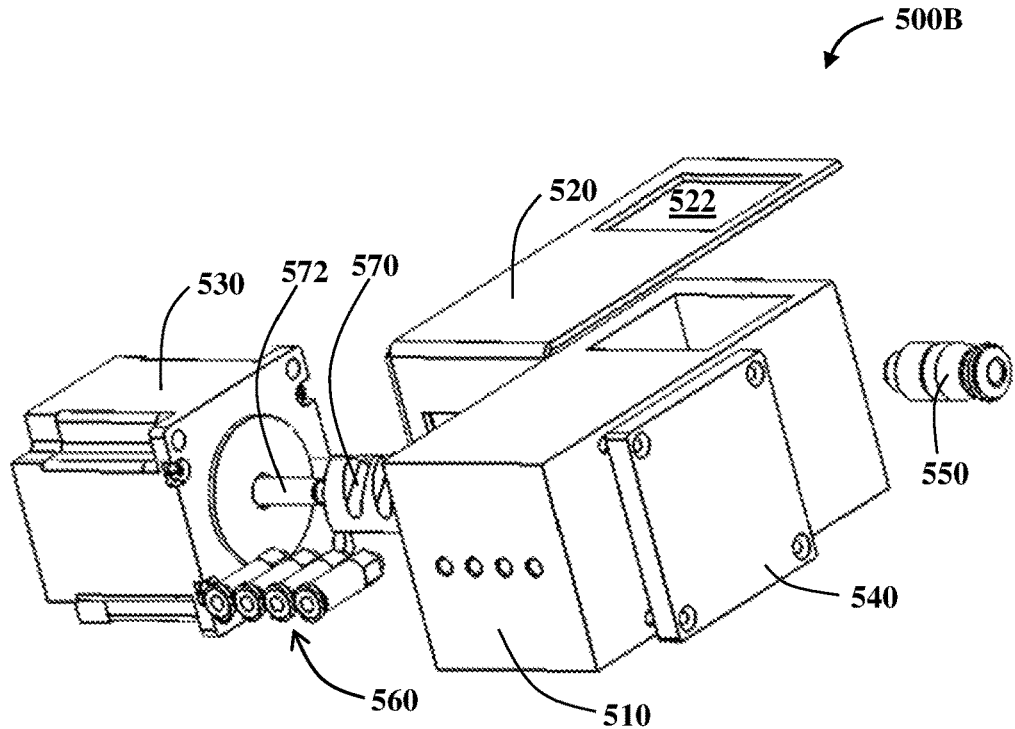
FIG. 5B is an exploded view of an additive feeder system showing a possible prototype assembly.

Reference is now made to FIG. 5A, there is provided an isometric view of an additive feeder system, which is generally indicated at 500A, showing a possible embodiment. The isometric view 500A includes a feeder body 510, hopper interface cover 520 with the opening 522 for the raw material, a driving system 530 of the feeder dosage control mechanism (as shown in FIG. 5B), a supporting plate 540, an air extraction pipe 550 and a feeder supply mechanism 560 operable to extract four additive feed-lines c1, c2, c3 and c4 from the associated supply unit (item 252, FIG. 1). The driving system of the feeder dosage control mechanism 530 may be an electric system, pneumatic system, hydraulic system or combinations thereof.

Where appropriate, multiple additive cords/feed-lines of various additive materials may be provided, for example in a various colors as described herein. Thus the four different colors may be used to create any color required. Still further additive feed-lines may provide other materials having still other properties or characteristics such as reflectivity, conductivity, florescence, photochromic or the like.

It is noted that the four feed-lines, as presented in this embodiment is shown by way of example only. Accordingly, the additive feeder system may support eight feed-lines or even more, covering the required range of colors or other characteristics. Additionally, the feed-lines may be arranged in different sets, each set comprising say eight feed-lines. As appropriate, a feed-line set may be exchanged automatically, if any of the feed-lines needs replacement.

Reference is now made to FIG. 5B, there is provided an exploded view of an additive feeder system, which is generally indicated at 500B, as shown in the prototype isometric view of FIG. 5A. It is particularly shown that the feeder dosage control mechanism comprises a cutter unit 570 installed on a driving shaft 572 of the driving system 530. The cutter unit 570 is operable to use a cutting mechanism of different types, such as a single bladed cutter, a multi-bladed cutter, a rotatable disk cutter, a guillotined scissor, a laser mechanism, a thermal cutter and the like.

It is noted that various colors may be added by providing additive feed-lines/cords and feeding additive into the system by cutting additive granules directly into molding or extruding machine. Accordingly, the freshly cut granules may meld into the liquid plastic in the exact proportions required on demand.

The control unit (item 310, FIG. 3A) may include feed control mechanisms for each additive (such as c1, c2, c3, c4 of FIG. 5A) feed-line operable to determine the feed rate of the additive cord. Accordingly the quantity of additive cut into the molding/extruding machine may be precisely determined. The control unit (item 310, FIG. 3A) may calculate the required length of each additive cord to be cut into machine by controlling motors, feeder drums and the like. The control unit may be configured to calculate the length of feed-line by a desired percentage increase.

The feed-line/cord may be cut by the cutter unit 570 into granules of convenient size e.g. 0.01 gram for a piece, and the colors mixed together in the motor driven extruding unit (item 140, FIG. 1), to obtain the required color or other properties/characteristics of plastic or the associated material. The control unit (item 310, FIG. 3A) may calculate the amount of color feed-line or other desired characteristics) to cut from every color (or other desired characteristics) feed-line as discussed herein.

Cutting Mechanism:

As appropriate, the feeder dosage control mechanism (item 260, FIG. 2) comprises a cutter unit (item 240, FIG. 2), or a cutting mechanism of various types, such as a single bladed cutter, a multi-bladed cutter, a rotatable disk cutter, a guillotined scissor, a laser mechanism, a thermal cutter and the like.

The cutter mechanism may be viewed in the exemplified prototype (item 570, FIG. 5B), as a double bladed mechanism. As illustrated in FIGS. 6A-D, shows the details of the double bladed mechanism, by way of example. It should be appreciated that other alternatives may be valid and operable to provide the cutting efficiency required.

Figure 6A:
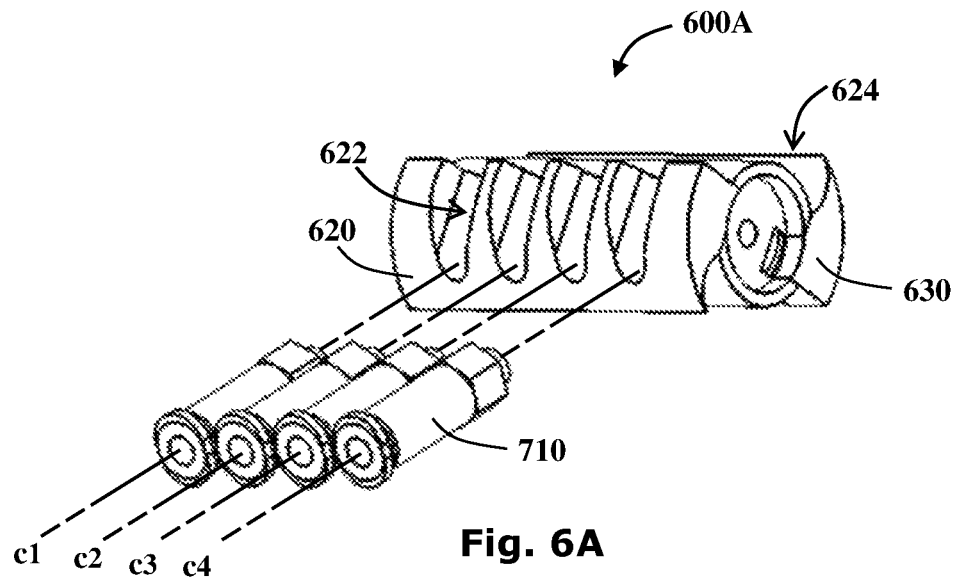
FIGS. 6A-D are various isometric views of a possible cutter unit components, including the blades and the driving shaft.

As illustrated in FIG. 6A, there is provided an isometric view of a double bladed cutter unit, which is generally indicated at 600A, operable to cut the feed-lines according to control unit configuration. The cutter unit 600A includes two cutter blades 620 and 630, each comprising cutting grooves 622 (associated with blade 620) leading the feed-lines of the feeder supply mechanism 610 (c1, c2, c3 and c4) to reach the cutting edge 624 of the cutter blade 630.

Figure 6B:
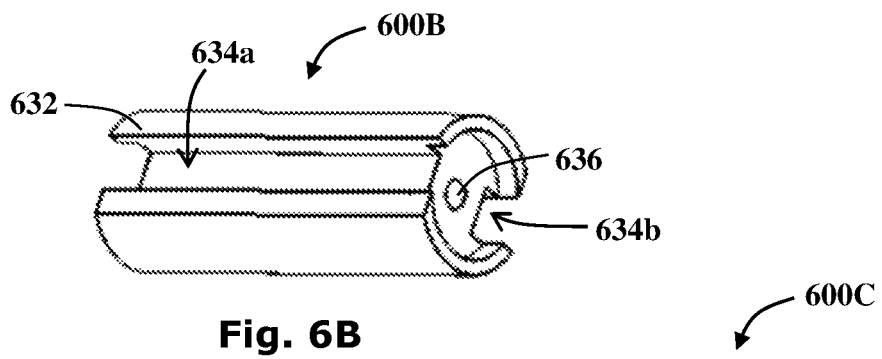
Figure 6C:
Figure 6D:
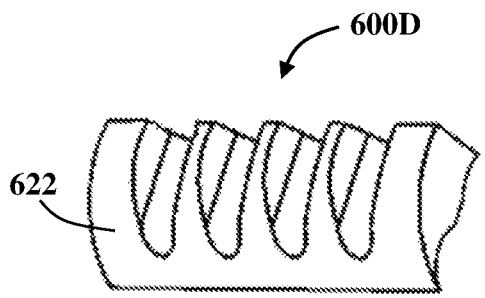

As illustrated in FIG. 6B, there is provided an isometric view of the cutter shank, which is generally indicated at 600B, configured to assemble the cutter blades into a cutter mechanism. The cutter shank 600B includes a two-sided groove 634a and 634b, operable to hold the cutter blades (items 620, 630 of FIG. 6A) and longitudinal bore 636 to allow the cutter mechanism to be mounted on the motor shaft (item 472, FIG. 5B). Further, as illustrated, FIGS. 6C-D are showing an isometric view of the two cutter blades (FIG. 6C) and one cutter blade (FIG. 6D), without the other components of the cutting mechanism.

Color & Liquids:

The feeder dosage control mechanism (such as item 260, FIG. 2) of the additive feeder system may include a pumping mechanism for driving an additive liquid colorant from a storage container (supply mechanism) through the feed-lines for mixing with the raw material. The mixing may also be administered at the throat of a processing machine to blend the liquid colorant with the flow of the raw material.

The mechanism may use various types of pumps, such as compressed air controlled diaphragm pump, solenoid driven pump, piezoelectric injection heads and the like, in order to move the liquid colorant. Various methods, monitored and controlled via the control unit (for example item 250, FIG. 2) to may be employed to accomplish the color dosing, such as using rotating discs with holes or slots to capture pellets and drop them into a mix or rely on screws of various diameters and a variable speed motor to adjust the rate of colorant dispensed so those are the type we will discuss here. Piezoelectric technology may be used, for example, using PZT (lead zirconate titanate) in a high-frequency technology. Thus, dosage resolutions ranging between 2 picoliters and 200 nanoliters may be achieved. Additionally or alternatively, beside the piezoelectric technology, each pump may be used according to a pulse principle, such as a solenoid pump, diaphragm pump or the like, as required. Furthermore, many dye injection heads of different materials may be used to produce nearly any desired color. The injection heads may comprise, for example, the four main colors of CMYK color model, RGB color including white and black, (Color Mixing BRYK) and special colors (e.g., gold and/or silver metallic colors), additives such as UV, heat resistant additives, flame reducers and the like. Additionally, high-pressure injection may be performed directly via a plug, disposed into the extruder, for example, and using technology as per the presently disclosed subject matter. Accordingly, the locations on the extruder can vary according to the comfort system and temperature limitations.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%. The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of". The phrase "consisting essentially of" means that the composition or method may include additional ingredients and/or steps, but only if the additional ingredients and/or steps do not materially alter the basic and novel characteristics of the claimed composition or method. As used herein, the singular form "a", "an" and "the" may include plural references unless the context clearly dictates otherwise. For example, the term "a compound" or "at least one compound" may include a plurality of compounds, including mixtures thereof. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. An additive feeder system for use in a manufacturing forming machine,
    said manufacturing forming machine comprising: at least one melting mechanism operable to convert a raw material into a melted material, said melting mechanism comprising at least one hopper operable to receive said raw material, a motor driven extrusion unit, a throat connecting the hopper to the motor driven extrusion unit, where the throat is attached to the motor driven extrusion unit, and at least one heater operable to melt said raw material;
    said additive feeder system operable to generate an additive material to provide desired product characteristics, said additive feeder system comprising:
    a feeder control unit operable to control the additive feeder system;
    a feeder supply mechanism operable to provide one or more feed-lines from at least one supply unit;
    a feeder dosage control mechanism operable to administer the additive material at a desired dosage; and
    wherein said additive feeder system is operable to provide a specific dosage of said additive material in real-time for mixing with the raw material to achieve the desired product characteristics; and
    wherein the additive material is generated from one or more feed-lines fed by the feeder supply mechanism into the feeder dosage control mechanism, and
    wherein said feeder dosage control mechanism comprises a cutter unit operable to administer mixing of the raw material with the additive material within the throat attached to the motor driven extrusion unit by cutting said one or more feed-lines in a desired length into the throat attached to the motor driven extrusion unit at a rate controllable by the feeder control unit such that the additive material thoroughly mixes with the raw material to form a mixture within the throat between the hopper and the motor driven extrusion unit prior to said mixture being introduced into the motor driven extrusion unit directly from the throat.

2. The additive feeder system of claim 1, wherein said feeder supply mechanism is operable to feed the one or more feed-lines from one or more feed-sets, each of said feed-sets configured to provide one or more feed-lines.

3. The additive feeder system of claim 1, wherein said feeder dosage control mechanism comprises at least one system operable to drive said additive feeder system selected from a group consisting of: an electric system, a pneumatic system and a hydraulic system.

4. The additive feeder system of claim 1, wherein said feeder dosage control mechanism comprises a cutter unit operable to cut said one or more feed-lines in a desired length and said additive material is cut by the cutter unit at a size such that said additive material does not fall into granules of the raw material.

5. The additive feeder system of claim 1, wherein said additive material is cut by the cutter unit at a weight of about 0.005 grams to 0.01 grams.

6. The additive feeder system of claim 1, said feeder control unit further comprising a processing unit operable to execute a software application, said software application comprising a computerized user interface operable to receive and send control commands.

7. The additive feeder system of claim 1, said feeder control unit further comprising a processing unit operable to execute a software application, said software application comprising a computerized user interface operable to receive and send control commands and wherein said processing unit is operable to interface with a mobile device via said computerized user interface.

8. The additive feeder system of claim 1, said feeder control unit further comprising a processing unit operable to execute a software application, said software application comprising a computerized user interface operable to receive and send control commands and wherein said processing unit is operable to interface with a remote server machine via said computerized user interface.

9. The additive feeder system of claim 1, wherein said one or more feed-lines comprises flexible characteristics such that the one or more feed-lines are capable of being wound in a pre-configured dimension.

10. The additive feeder system of claim 1, said feeder control unit further comprising a controller operable to communicate commands comprising at least one control signal, and wherein said feeder control unit is operable to receive a colored image representing a raw material gray level parameter.

11. The additive feeder system of claim 1, wherein said feeder control unit is operable to receive a colored image representing a final product color parameter.

12. The additive feeder system of claim 1, further comprising a data collector module operable to collect operational data, enable learning and further fine tune input parameters.

13. An additive feeder system for use with a batch-blender machine, said batch-blender machine comprising at least one hopper operable to receive a raw material, a motor driven extrusion unit operable to mix the raw material homogenously, a throat connecting the hopper to the motor driven extrusion unit, where the throat is attached to the motor driven extrusion unit, and a discharge unit operable to discharge the mixed material;
    said additive feeder system operable to generate an additive material to provide desired product characteristics, said additive feeder system comprising:
    a feeder control unit operable to control the additive feeder system;
    a feeder supply mechanism operable to provide one or more feed-lines from at least one supply unit;
    a feeder dosage control mechanism operable to administer the additive material at a desired dosage; and
    wherein said additive feeder system is operable to provide a specific dosage of said additive material in real-time for mixing with the raw material to achieve the desired product characteristics; and
wherein the additive material is generated by one or more feed-lines fed by the feeder supply mechanism into the feeder dosage control mechanism, and
wherein said feeder dosage control mechanism comprises a cutter unit operable to administer mixing of the raw material with the additive material within the throat attached to the motor driven extrusion unit by cutting said one or more feed-lines in a desired length into the throat attached to the motor driven extrusion unit at a rate controllable by the feeder control unit such that the additive material thoroughly mixes with the raw material to form a mixture within the throat between the hopper and the motor driven extrusion unit prior to said mixture being introduced into the motor driven extrusion unit directly from the throat.

\* \* \* \* \*